United States Patent [19]
Yost, Jr.

[11] 3,739,700
[45] June 19, 1973

[54] PREREGISTERED MULTISPECTRAL PHOTOGRAPHS

[75] Inventor: Edward F. Yost, Jr., Northport, N.Y.

[73] Assignee: Spectral Data Corporation, Hauppauge, N.Y.

[22] Filed: June 24, 1970

[21] Appl. No.: 49,252

[52] U.S. Cl. .................................. 95/12.2, 355/37
[51] Int. Cl. .......................................... G03b 33/04
[58] Field of Search ................. 355/37; 352/66, 67; 353/31; 95/12.2

[56] References Cited
UNITED STATES PATENTS

| | | | |
|---|---|---|---|
| 2,553,285 | 5/1951 | Thomas | 355/37 |
| 2,530,793 | 11/1950 | Thomas | 95/12.2 |
| 2,008,099 | 7/1935 | Fitz | 353/31 |
| 973,962 | 10/1910 | Oliver | 353/31 |
| 1,261,800 | 4/1918 | Evans | 352/66 |
| 2,315,783 | 4/1943 | Gilmore | 352/67 |

Primary Examiner—John M. Horan
Attorney—Eliot S. Gerber

[57] ABSTRACT

Multispectral photographs preregistered for projection are made by reproducing a first set of multispectral photographs, taken by a multispectral camera, to provide a second set of photographs all on the same scale. The photographs of the second set are simultaneously projected on a viewing screen, and their positions are adjusted so that the projected images are accurately superimposed. The photographs of the second set are reproduced in their adjusted positions to provide a third set of photographs on a single strip of film. The photographs of the third set are preregistered. A series of sets of photographs preregistered in this manner can be projected with great ease, since no adjustment of the projector between successive projections is necessary.

1 Claim, 7 Drawing Figures

Patented June 19, 1973

INVENTOR.
EDWARD J. YOST, Jr.

BY his ATTORNEYS

PREREGISTERED MULTISPECTRAL PHOTOGRAPHS

BACKGROUND OF THE INVENTION

This invention relates to multispectral photography and, more particularly, to a novel and highly-effective method and apparatus facilitating the preparation of preregistered multispectral photographs for projection and to the preregistered photographs per se.

Multispectral photography is a remote-sensing technique of substantial and increasing importance. It is useful in making surveys of the earth from airplanes or satellites in connection with prospecting, military reconnaissance, ecological studies, and many other pursuits. The principles of multispectral photography are set forth in my copending application, Ser. No. 30,199, filed Apr. 20, 1970, for SPECTRAL-ZONAL COLOR RECONNAISSANCE SYSTEM, which is a continuation of my application, Ser. No. 519,854, filed Jan. 11, 1966, for SPECTRAL-ZONAL COLOR RECONNAISSANCE SYSTEM, now abandoned. Several images, typically four, of a selected target are simultaneously formed on black-and-white panchromatic film through a plurality of lenses associated with filters respectively having maximum transparency in different regions of the electromagnetic spectrum. The film is developed, and the several resulting photographs are projected in a special viewer having a separate lens system for each photograph. With proper adjustment of the viewer, the projection lenses thereof project the several photographs in accurately superimposed relation to form a single composite image on a viewing screen. Colored filters are associated with the projection lenses, but the filters are, in general, not the same as the filters respectively employed in taking the pictures. The composite image is therefore in false color, and, by individual adjustment of the chromaticity, brightness and saturation associated with each projected image, much information regarding the target can be gathered.

For purposes of scientific study, the positioning of the photographs in the viewer can be done separately by hand for each set of photographs to be projected. For many purposes, however, such a laborious process leaves much to be desired, since hours of trial and error may be required for the accurate adjustment of each set of photographs in the viewer. It is distinctly advantageous, in making a presentation to any large audience, to top management of a company, or to government officials at a high level, for example, to be able to project one multispectral slide after another with the same ease and facility one enjoys in displaying conventional slides, regardless of the design of the camera or cameras used in taking the multispectral photographs. This has not been possible by any means heretofore available.

SUMMARY OF THE INVENTION

An object of the invention is to remedy the deficiencies of conventional methods and apparatus outlined above and, in particular, to provide a method and apparatus greatly facilitating the projection of a series of multispectral photographs on a viewing screen.

The foregoing and other objects are attained in accordance with the invention by the provision of scale-correcting means for reproducing a first set of multispectral photographs as necessary to provide a second set of photographs all on the same scale and multispectral projection means for projecting the photographs of the second set on a viewing screen. Adjustment means is provided for adjusting the positions of the photographs of the second set with respect to one another and with respect to the projection means as necessary to produce accurately superimposed projections thereof on the viewing screen and for fixing the photographs of the second set in their adjusted positions. Means is also provided for reproducing the photographs of the second set in their adjusted positions to provide a third set of photographs on a single strip of film. The film strip, or a positive made therefrom by contact printing, is mountable in the projection means with the photographs of the third set in the same positions with respect to each other and with respect to the projection means as the photographs of the second set in their adjusted positions.

The photographs of the third set are preregistered so that a series of such photographs can be projected in rapid succession with confidence that each projected composite image will be crisp the instant it appears on the screen.

BRIEF DESCRIPTION OF THE DRAWING

An understanding of additional aspects of the invention can be gained from a consideration of the following detailed description of representative embodiments thereof, in conjunction with the appended figures of the drawing, wherein.

DESCRIPTION OF THE PREFERRED EMBODIMENT

Figure 1:
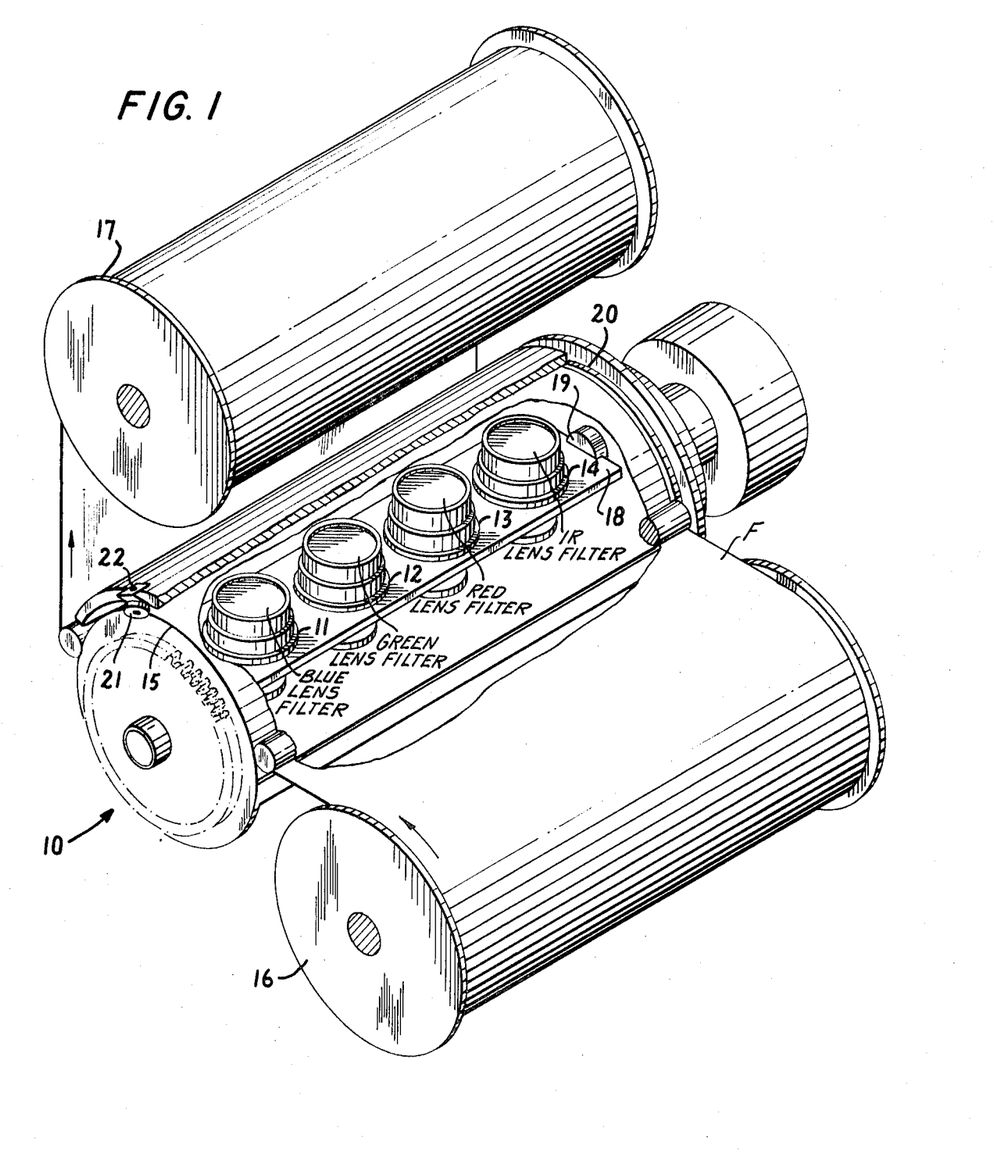
FIG. 1 is a schematic perspective view of a multispectral camera illustrative of means for producing multispectral photographs for processing and display in accordance with the invention.

FIG. 1 shows a multispectral camera 10 representative of means for taking a set of multispectral photographs for processing in accordance with the invention. The camera 10 comprises means for individually exposing, in precise relative positions, discrete portions of a photosensitive film F to a common scene by illumination by separated zones of the actinic electromagnetic spectrum to form multiple images thereon. Specifically, the camera 10 of FIG. 1 includes four lens-filter combinations 11–14 of negligible distortion, bore sighted to eliminate differential tip or tilt, and designed individually to transmit radiation from the scene corresponding to any four zones of the actinic electromagnetic spectrum from ultraviolet through near infrared or beyond. For example, the lens-filter combination 11 may transmit energy in the blue region from 4,000 A to 5,200 A; the lens-filter combination 12 in the green region from 4800 A to 6100 A; the lens-filter combination 13 in the red region from 5900 A to 7100 A; and the lens-filter combination 14 in the infrared region from 7100 A to 9000 A. These restrictions in spectral bandwidths can be accomplished by the use of standard commercial Wratten filters numbers 47, 58B, 25, and 89B, respectively. Other filters may be used in applications where different spectral transmission bands are desired. Since the lens-filter combinations 11, 12, and 13 have transmission characteristics overlapping that of the infrared combination 14, an infrared cutoff filter is preferably included in each of the units 11, 12, and 13.

The camera represented in FIG. 1 is of the stationary film, moving lens, panchromatic type illustrated by way of example. It will be apparent, however, that other well-known types of aerial cameras may be employed such as the moving-film panchromatic and frame and strip cameras. In the camera of FIG. 1, a strip of film F passes from a supply spool 16 to a takeup spool 17 via a cylindrical vacuum platen 15. With such an arrangement, the lens-filter combinations 11, 12, 13, and 14 are mounted on a support 18 and oscillate about a pivotal shaft 19 disposed coaxially with the cylindrical platen 15 for panoramic scanning. The lens-oscillating mechanism may be of the conventional type and is omitted from the drawing for the sake of clarity.

In order to aid in accurate registration of positives made from images on the film F, there is provided a reference flange or surface 20, against which the film F is lightly indexed by means of a roller 21 mounted on a light spring 22. In contrast to the elaborate processing required in making multicolor positive prints or transparencies from a multicolor exposed negative, the latent images on the exposed monochrome film F may be developed *in situ*, using any of a number of available techniques such as a saturated hydrophylic layer, a porous plastic web, or conventional wet processing. The time required in processing such a positive transparency is a small fraction of that for processing multilayer color films.

The camera described above is disclosed in my copending application, Ser. No. 30,199 identified above and is not claimed herein per se.

FIG. 1 shows only one of an indefinitely large class of means for taking multispectral photographs for processing in accordance with the invention. It is also clearly possible to use a camera similar to the one shown in FIG. 1 but having four film strips, one for each lens, or to employ four separate cameras.

A problem that significantly impedes the rapid presentation of slides made by multispectral cameras is that the four camera lenses are usually not identical. In particular, the focal length varies slightly from lens to lens, notwithstanding the greatest care in manufacture. Moreover, a change in the filter for any of the camera lenses changes the focal length of the lens-filter combination, so that refocussing is necessary to produce a sharp image. Such refocussing changes the scale of the recorded imagery. In general, therefore, the several photographs made by the camera means during any given exposure will all be on somewhat different scales. This is further complicated in that the relative scales of the several photographs of a set to be projected simultaneously are not fixed but change from one set to the next, depending on the lens-filter combinations employed in the camera means.

Another problem, which is characteristic particularly of the case where separate cameras or separate film strips in a single camera are employed, is that it is very difficult to adjust the x and y coordinates of the photographs for projection, as well as their angular orientation, so that the position and orientation of each photograph in its projection system correspond exactly to the position and orientation of every other photograph in the projection systems to which they are respectively proper.

These problems make it very difficult to project all of the images of a set, or a selected plurality of them, in exactly superimposed relation. While superimposed projected images can ultimately be achieved by trial and error, such a process of adjustment is laborious and time-consuming and must be repeated for each set to be projected.

All of these problems are solved by the present invention, in accordance with which it is possible to process multispectral photographs from any source so that they are preregistered and fully compatible with the projector. In the absence of the present invention, the camera illustrated in FIG. 1 is capable of taking multispectral photographs preregistered for projection—but only so long as all the photographs are on a single film strip and then only in a projector of which the projection lenses have an arrangement and spacing substantially the same as the arrangement and spacing of the camera lenses. The present invention makes it possible to process pictures made by the camera of FIG. 1, whether on one film strip or several, so that they are campatible with a projector having an arrangement and spacing of projection lenses the same as or different from the arrangement and spacing of the camera lenses. Thus, pictures made by a variety of cameras in locations around the world can be processed in accordance with the invention in a manner now to be explained in detail for showing on a single projector.

Figure 2:
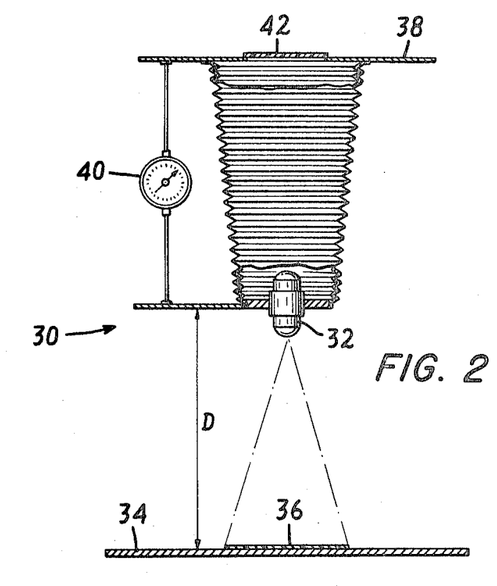
FIG. 2 is a schematic side elevational view, partly in section, of a scale-correcting printer used in accordance with the invention to correct the scale of multispectral photographs made by the apparatus of FIG. 1.

FIG. 2 shows scale-correcting means 30 for reproducing the photographs of a first set—i.e., the photographs, preferably the original negatives, made by the multispectral camera 10—as necessary to provide a second set of photographs, preferably positives, all on the same scale. The scale corrector 30 comprises a scale-correcting positive lens 32 with a large depth of focus. It may be, for example, an f/45 lens. At least one of the conjugate distances of the lens 32 is variable. Thus, if the lens 32 is mounted at a fixed distance D such as 8 inches above a duplicating film plane 34 where unexposed film 36 is placed, the object plane 38 is at a variable distance, which may be close to 8 inches but need not be exactly 8 inches, on the opposite side of the lens 32. A precise height gauge 40 accurately measures the distance between the object plane 38 and the lens 32. A negative 42 to be reproduced on an enlarged or reduced scale is placed in the object plane 38 and the usual auxiliary means including a light and shutter, etc., is provided so that the film 36 can be given the desired exposure.

The negative 42 can be reproduced on any desired scale, within wide limits, by varying the distance between the object plane 38 and the rear node of the lens 32. Strictly speaking, varying one conjugate distance varies the other. However, with a large depth of focus, no defocussing results notwithstanding a small departure of the conjugate distances from their exact mathematical relationships. Since the lens 32 is positive and a real image is formed at the duplicating film plane 34, the image at the plane 34 is enlarged by moving the object film plane 38 closer to the lens 32 and reduced by moving the object film plane 38 farther from the lens 32. It is also possible to reverse the positions of the negative 42 and reproducing film 36 (with appropriate adjustments of the light, etc.), in which case a reproduction on a larger scale is obtained by moving the plane 38 farther from the lens 32 and a reproduction on a smaller scale is obtained by moving the plane 38 closer to the lens 32. Also, of course, both the object and image planes may be movable, since this also makes it possible to obtain the correct relationship between the distance between the lens 32 and the object plane and the distance between the lens 32 and the image plane. This has the advantage that a high-speed lens with small depth of focus can be used, since object and image planes can always be exactly at the mathematically determined conjugate distances. However, easiest correction is obtained when one conjugate distance is fixed and the other is variable, and a small-aperture lens is employed, as illustrated.

When the correct distances to produce the desired scale correction are established between the lens 32 and the object and image planes, the reproducing film 36 is exposed. Measurement of the correct distance is facilitated by the gauge 40.

The gauge 40 is calibrated for a given camera configuration by photographing a star field at night, using the same camera configuration. Any one of the photographs after development is arbitrarily selected and placed in the image plane 34, and the remaining photographs are placed successively in the object plane 38. After placement of each photograph in the object plane 38, the distance between the plane 38 and the lens 32 is adjusted to achieve superimposition of the star image of the photograph in the plane 38 as projected on the plane 34 and the star image of the photograph in the plane 34. The height as measured by the height gauge 40 is noted for each superimposition.

After the calibration is made, the photographs of a target of interest made by the camera 10 in the same configuration are easily reproduced so that they are all on the same scale. Successive simultaneously made photographs 42 of a target of interest are placed in the object plane 38 and successive duplicating films 36 in the image plane 34. After placement of each photograph in the plane 38, the distance between the plane 38 and the lens 32 is adjusted to the same value (as measured by the gauge 40) as was required to achieve superimposition of the star field image made by the same lens on the star field image of the arbitrarily selected photograph. The heights noted on the height gauge 40 during calibration are thus employed successively to reproduce the several camera negatives. The photograph of the target made by the lens-filter combination that made the arbitrarily selected star field image is already on the correct scale and hence is reproduced with the image and object distances of the lens 32 equal.

Thus, the apparatus of FIG. 2 constitutes scale-correcting means for reproducing a first set of photographs, preferably though not necessarily negatives, made by multispectral camera means, as necessary to provide a second set of photographs, preferably though not necessarily positives, all on the same scale.

Figure 3:
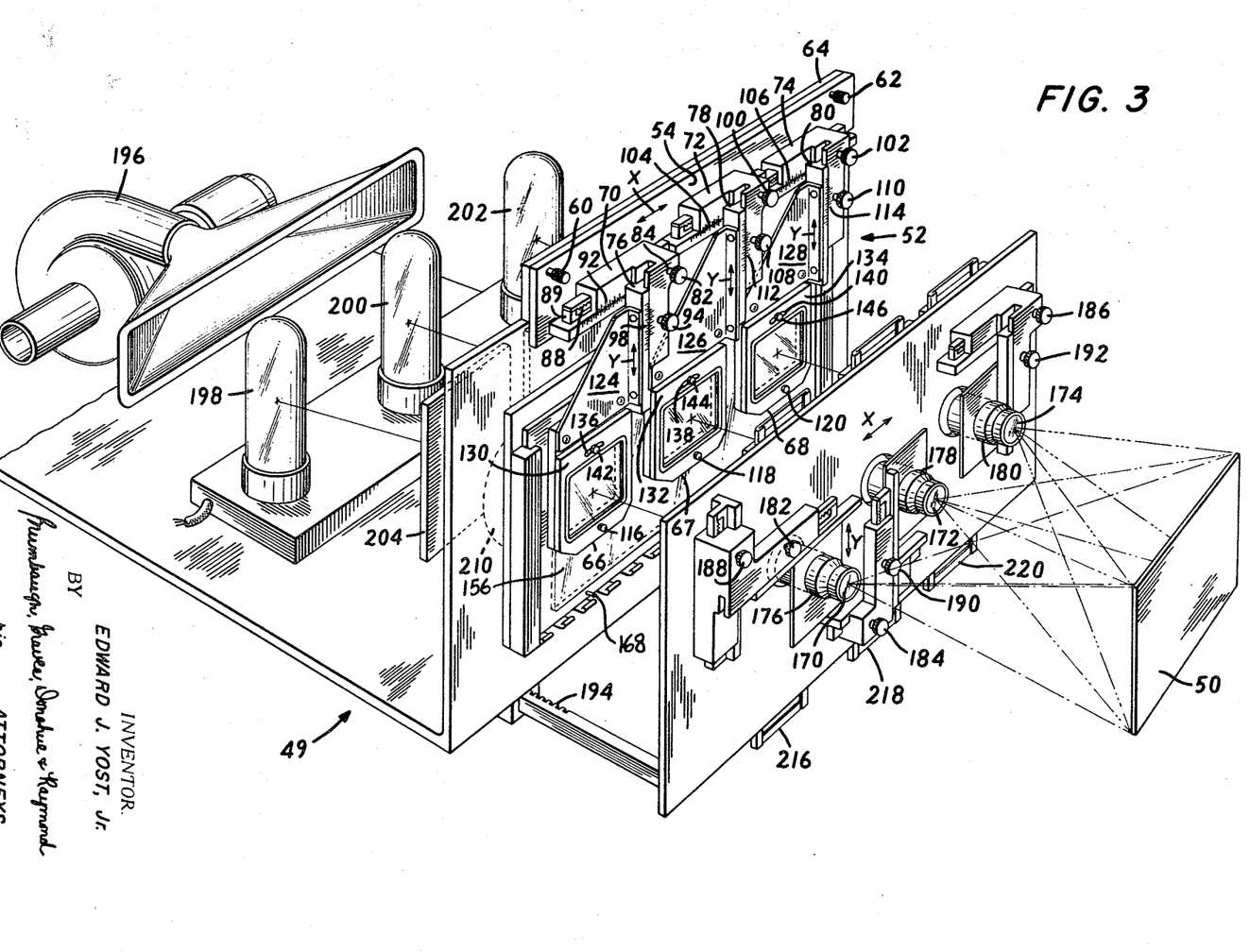
FIG. 3 is a perspective schematic view of a first representative embodiment of multispectral projection apparatus constructed in accordance with the invention, the apparatus being shown in its configuration facilitating preregistration of three multispectral photographs scale-corrected by the apparatus of FIG. 2.

FIG. 3 shows multispectral projection means 49 for projecting the positive photographs of the second set on a viewing screen 50, which can be either a front-projection screen or a rear-projection screen, and adjustment means 52 operatively associated with the projection means 49 for adjusting the positions of the photographs of the second set with respect to each other and with respect to the projection means 49 as necessary to produce accurately superimposed projections on the viewing screen 50 and for fixing the photographs of the second set in their adjusted positions. Generally, although four pictures of each scene are taken by the camera 10, only three are selected for projection at any one time, since three are sufficient to achieve the desired display in which density differences among corresponding parts of the several photographs are identifiable by the color of the corresponding part of the composite projected image.

Figure 4:
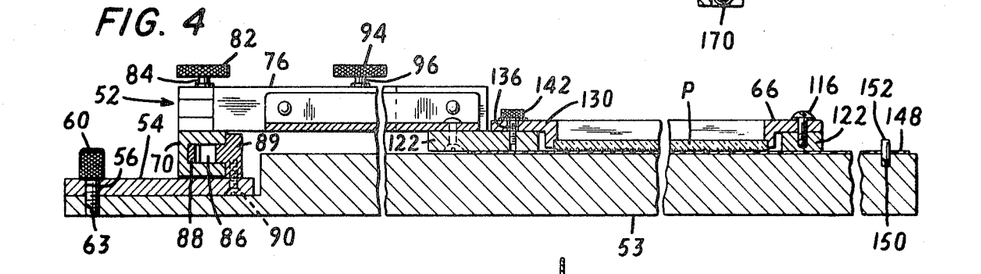
FIG. 4 is a side elevational view, partly in section, of a printing jig constructed in accordance with the invention and facilitating printing of photographs as positioned with respect to each other by the apparatus of FIG. 3 on a single film strip.

As FIGS. 3 and 4 show, the adjustment means 52 includes a registration jig that can be transferred from the projection means 49 (FIG. 3) to a printing bed 53 (FIG. 4). The adjustment means 52 comprises a cross member 54 formed with holes 56 (one of which is visible in FIG. 4) that cooperate with alignment pins 60 and 62. The alignment pins pass through the holes 56 and also through corresponding holes in the frame 64 of the projection apparatus 49 or in the bed 53. One such hole 63 is visible in FIG. 4. The member 54 is thus accurately positioned with respect to the projection means 49 (FIG. 3) or printing bed 53 (FIG. 4), as the case may be. Film holders 66, 67 and 68 are mounted on the cross frame 54 by means including microscope stages. The holders 66, 67 and 68 are adjusted in the x-direction (FIG. 3) by stages 70, 72 and 74, respectively, and in the y-direction by stages 76, 78 and 80, respectively. Adjustment in the z-direction is unnecessary, because the images are all on the same scale by virtue of the use of the apparatus of FIG. 2.

The microscope stage 70 is conventional and may include worm gears or any other convenient adjustment mechanism. For purposes of illustration it is shown as including knurled knob 82 (FIGS. 3 and 4) mounted on a shaft 84 carrying a pinion gear 86. The pinion gear 86 turns with the knob 82 and shaft 84 and meshes with a rack 88 connected to a rail 89 held by screws such as the one indicated at 90 in stationary relation with respect to the member 54. Since the member 54 is fixed to the bed 53 or frame 64 by the pins 60 and 62, the rack 88 is stationary. Rotation of the knob 82 thus moves the stage 70, which is slidable on the rack 88, and picture holder 66 in the x-direction. Calibration marks 92 facilitate a reading of the x coordinate.

The stage 76 is similar to the stage 70 and includes a knurled knob 94 mounted on a shaft 96 carrying a pinion gear that meshes with a rack (not shown) for adjustment in the y-direction. Calibration marks 98 facilitate a reading of the y coordinate.

The stages 72 and 74 are like the stage 70 and include knobs 100 and 102, respectively, for adjustment in the x-direction. Calibration marks 104 and 106 facilitate a reading of the x coordinates.

The stages 78 and 80 are like the stage 76 and include knobs 108 and 110, respectively, for adjustment in the y-direction. Calibration marks 112 and 114 facilitate a reading of the y coordinates.

Adjustment in rotation is important and is facilitated by pivot pins 116, 118 and 120, respectively, fixed in backing plates of the holders 66, 67 and 68 such as the backing plate 122. The backing plates are secured to braces 124, 126 and 128, respectively, that are in turn secured to the stages 76, 78 and 80. Front plates 130, 132 and 134 pivot respectively about the pins 116, 118 and 120. Slots 136, 138 and 140, preferably arcuate, are formed in the front plates 130, 132 and 134, respectively, and set screws 142, 144 and 146 pass through the slots 136, 138 and 140, respectively, for arresting the front plates 130, 132 and 134 in any desired orientation.

The scale-corrected photographs produced by the apparatus of FIG. 2 are mounted on the film holders 66, 67 and 68, respectively, and fixed to the front plates 130, 132 and 134. One such photograph P, which may be on a glass plate, is shown in FIG. 4. The emulsion sides of the scale-corrected photographs are flush against the emulsion side of a single film strip of low-shrinkage film 148. The film strip 148 is formed with a pair of punched index holes such as the hole 150, and a corresponding pair of pins such as the pin 152 mounted in the printing bed 53 accurately position the film 148.

An operator of the equipment first mounts the adjustment means 52 in the apparatus 49 (FIG. 3) and makes adjustments in the x-direction, the y-direction, and the angular orientation of the several photographs in order to superimpose the images of the photographs quite accurately on the screen 50.

The photographs thus positioned are transferred, without disturbing their relative positions, to the printing jig of FIG. 4, which thus constitutes means for reproducing the scale-corrected positive photographs of the second set in their adjusted positions to provide a third set of photographs, preferably negatives, on a single strip of film. The photographs of the third set have the same relative positions and orientations as the photographs of the second set. Moreover, they are in positions and orientations with respect to the film strip that are a unique function of the adjustments of the microscope stages 70, 72, 74, 76, 78 and 80, and of the adjustments of the angular orientations about the pivots 116, 118, and 120. This is ensured by the provision of the pair of pins 152 that cooperate with corresponding holes accurately prepunched in the film strip and the pair of pins 60 and 62 that position the registration jib accurately with respect to both the projection apparatus 49 and the printing bed 53.

The film strip 148 is developed and becomes a master preregistered negative from which any number of preregistered positives can be made by contact printing. The positives may be regarded as included in the third set of photographs discussed above, since they have identical registration properties. The film strip containing the third set of photographs is mountable in the projection means 49 with the photographs of the third set in the same positions with respect to each other and with respect to the projection means 49 as the photographs of the second set in their adjusted positions.

Figure 5:
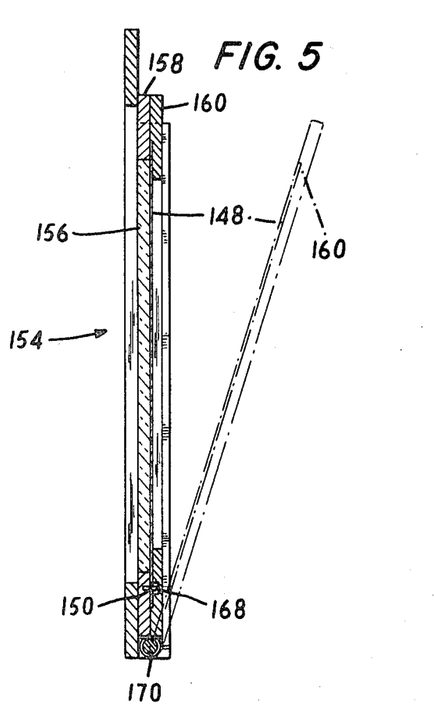
FIG. 5 is a side elevational view, partly in section, of a holder for the film strip containing the photographs printed by the apparatus of FIG. 4.
Figure 6:
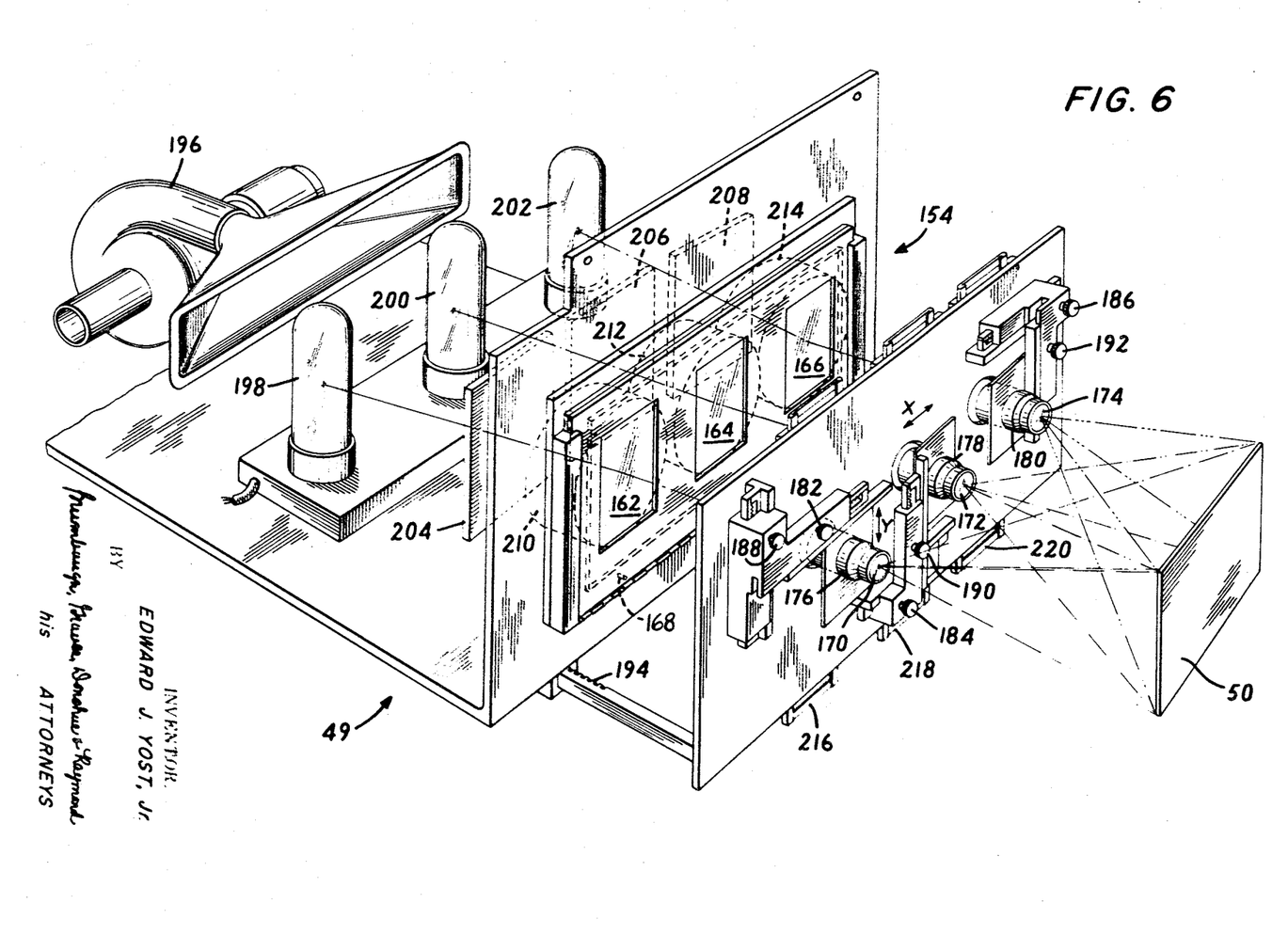
FIG. 6 is a view similar to FIG. 3 but showing the apparatus incorporating the holder of FIG. 5 and in its configuration facilitating projection of the preregistered multispectral photographs.

FIGS. 5 and 6 show a film holder 154 designed to serve the mounting function. The film holder 154 comprises a glass back 156 held in a frame 158 and a frame front 160 formed with three holes 162, 164 and 166 (FIG. 6) for the three (if that is the number) photographs on the film strip 148. The frame 158 is formed with two pins such as the pin 168 that register accurately with the holes 150 prepunched in the film strip 148. The film strip 148 is held flat between the back 156, 158 and front 160. The back 156, 158 and front 160 are hinged at the bottom by a hinge 170 from which the pin is removable. The hinge pin and the front 160 are removed When the registration jig is attached (FIG. 3). When the photographs of the third set are to be projected, the front 160 is hinged in position as shown in FIG. 5, the film strip 148 is inserted with its prepunched holes engaging the alignment pins 168, and the holder is closed and mounted in the projector 49 as shown in FIG. 6.

During the projection of the photographs of the set, exact registration of the images is achieved on the screen at any predetermined conjugate distance. Such registration is achieved without the laborious adjustments that have characterized multispectral displays prior to the time of the present invention.

Projection lenses 170, 172 and 174 are mounted in tubes 176, 178 and 180, respectively. The tubes 176, 178 and 180 are adjusted in the x-direction by microscope stages having adjustment knobs 182, 184 and 186, respectively, and in the y-direction by microscope stages having adjustment knobs 188, 190 and 192, respectively. This causes corresponding adjustments in the x-direction and the y-direction of the respective images on the viewing screen 50.

Adjustment in the z-direction, in order to focus the several images on the viewing screen, is provided by motion of the lenses individually along the axes of their respective tubes. In addition, a rack 194 is provided for moving all three lenses together as a unit for focussing at any desired conjugate distances. This makes it easy to refocus when the screen is moved back to provide a larger image for viewing by a larger audience or when the apparatus is set up in any new auditorium, where the lens-to-screen distance may be different from the one for which the apparatus was previously set.

The projection apparatus includes the usual blower 196, which is represented as a single unit but which may comprise two or three units for greater efficiency, lamps 198, 200 and 202, each supplied with current at, say, 60 hertz and 120 volts, heat-absorbing glasses 204, 206 and 208, and condenser lenses 210, 212 and 214. Filters are mounted in holders 216, 218 and 220, respectively adjacent to each projection lens 170, 172 and 174. Alternatively, the filters can be mounted between the heat-absorbing glasses 204, 206 and 208 and the condensers 210, 212 and 214. The filters can be colored red, green and blue, respectively, or any other colors that may be desired. In this way, the operator can give any desired predominant color to the projected image of each transparency and thereby produce on the screen 50 a composite image in true or false color, depending on whether all of the selected projection filters do or do not correspond to the filters respectively used in the multispectral camera in taking the pictures used to make the transparencies.

Means (not shown) including additional light sources, beams spitters, and neutral-density filters may be provided so that the saturation and brightness of each projected image can be individually controlled.

Figure 7:
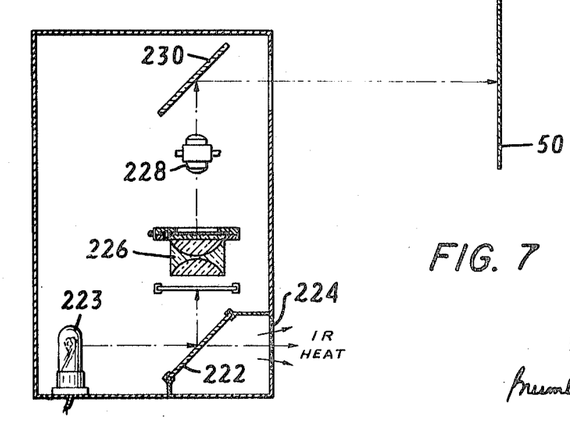
FIG. 7 is a schematic side elevational view, partly in section, of another representative embodiment of multispectral projection apparatus constructed in accordance with the invention.

FIG. 7 shows an alternate embodiment that is particularly desirable when high wattage lamps are employed and the heat must be dissipated before reaching the condensers. Dichroic heat-transmitting visible-light-reflecting beam splitters such as the one indicated at 222 transmit heat from the lamp 223 toward a wire mesh screen 224 and reflect visible light from the lamp 223 toward a condenser 226, projection lens 228 and mirror 230 for projection on the viewing screen 50.

Thus, there are provided in accordance with the invention novel and highly effective methods and apparatus facilitating the preparation of preregistered multispectral photographs for projection. In accordance with the invention, a series of multispectral photographs can be presented to an audience rapidly and effectively, without the annoying loss of time that has heretofore characterized such presentations.

Many modifications of the representative embodiments of the invention disclosed herein will readily occur to those skilled in the art upon a reading of the present disclosure. Accordingly, the invention is to be construed as including all of the embodiments thereof within the scope of the appended claims.

I claim:

1. A method of producing preregistered multispectral photographs comprising the sequence of steps of forming, on black-and-white film and respectively employing different zones of the actinic electromagnetic spectrum, at least three photographs of a common scene overflown by an airplane or satellite or the like, the plurality of photographs constituting, a first set of multispectral photographs; reproducing at least one of the photographs of the first set with scale correction, which with the remaining ones of the first set provides a second set of at least three photographs all on the same scale; projecting the photographs of the second set on a viewing screen simultaneously, adjusting the positions of the photographs of the second set to produce accurately superimposed projections forming a composite image on the viewing screen by moving one or more of the photographs laterally, longitudinally and about an axis as necessary for coincidence during said superimposed projection, and reproducing the photographs of the second set in their adjusted positions to provide a third set of at least three photographs on a single sheet of film; wherein the photographs of the second set are film negatives and the film sheet of the third set is a positive and wherein the reproducing of the second set is by printing of the second set as adjusted; whereby said film sheet is mountable in a projector with the photographs of the third set in the same positions with respect to each other as the photographs of the second set in their adjusted positions.

* * * * *

UNITED STATES PATENT OFFICE
CERTIFICATE OF CORRECTION

Patent No. 3,739,700         Dated June 19, 1973

Inventor(s) YOST, EDWARD F., JR.

It is certified that error appears in the above-identified patent and that said Letters Patent are hereby corrected as shown below:

Column 8, line 24, insert -- set -- before "third".

Signed and sealed this 25th day of December 1973.

(SEAL)
Attest:

EDWARD M. FLETCHER, JR.             RENE D. TEGTMEYER
Attesting Officer                   Acting Commissioner of Patents